US007844182B2

(12) United States Patent
Mostert et al.

(10) Patent No.: US 7,844,182 B2
(45) Date of Patent: Nov. 30, 2010

(54) OPTICAL NETWORK ARCHITECTURE FOR SIMULTANEOUS TRANSPORT OF ANALOG VIDEO SIGNALS AND ETHERNET DATA

(75) Inventors: Willem Mostert, Issaquah, WA (US); Oleh Sniezko, Highlands Ranch, CO (US); Ricardo Villa, Santa Clara, CA (US); Samuel Chang, Redwood City, CA (US); Charles Barker, Sunnyvale, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 736 days.

(21) Appl. No.: 10/767,401

(22) Filed: Jan. 29, 2004

(65) Prior Publication Data

US 2005/0058453 A1    Mar. 17, 2005

Related U.S. Application Data

(60) Provisional application No. 60/502,323, filed on Sep. 12, 2003.

(51) Int. Cl.
    *H04J 14/02* (2006.01)
(52) U.S. Cl. .......................................... 398/83; 398/68
(58) Field of Classification Search ............. 398/67–68, 398/83
    See application file for complete search history.

(56) References Cited

U.S. PATENT DOCUMENTS

| 4,662,715 A | * | 5/1987 | Shutterly ..................... 385/24 |
| 4,957,339 A | * | 9/1990 | Fussganger et al. ........... 398/82 |
| 5,005,936 A | * | 4/1991 | Hsu ............................. 398/79 |
| 5,283,687 A | * | 2/1994 | Hsu et al. ................. 359/341.2 |
| 5,289,554 A | * | 2/1994 | Cubukciyan et al. .......... 385/76 |
| 5,317,440 A | * | 5/1994 | Hsu ............................. 398/41 |
| 5,563,733 A |   | 10/1996 | Mitsuda et al. |
| 5,633,741 A | * | 5/1997 | Giles ............................. 398/79 |
| 5,864,748 A | * | 1/1999 | Dail ........................... 725/126 |
| 5,949,563 A | * | 9/1999 | Takada .......................... 398/7 |
| 6,097,533 A | * | 8/2000 | Atlas .......................... 359/337 |
| 6,211,978 B1 | * | 4/2001 | Wojtunik ....................... 398/9 |
| 6,445,472 B1 | * | 9/2002 | Kim et al. ..................... 398/79 |
| 7,088,921 B1 | * | 8/2006 | Wood .......................... 398/67 |
| 2006/0165413 A1 | * | 7/2006 | Schemmann et al. .......... 398/71 |

FOREIGN PATENT DOCUMENTS

| EP | 0729248 A2 | 8/1996 |
| WO | WO 99/43108 A1 | 8/1999 |

OTHER PUBLICATIONS

Krimmel, H. and R. Heidemann. "Wavelength division multiplexed CATV distribution service overlay on two-fibre passive optical dialogue star networks." Electronics Letters, vol. 29, No. 9, Apr. 29, 1993: 768-769.*
International Search Report from PCT/US2004/030001, Jan. 25, 2005.
Written Opinion of the International Searching Authority from PCT/US2004/030001, Jan. 25, 2005.

* cited by examiner

*Primary Examiner*—Leslie Pascal
(74) *Attorney, Agent, or Firm*—John Bruckner PC

(57) ABSTRACT

Methods and apparatus are described for simultaneous transport of analog video signals and Ethernet data on an optical fiber. A method includes propagating a downstream signal on an optical signal conductor from an upstream combiner to a downstream combiner; and propagating an upstream signal on the optical signal conductor from the downstream combiner to the upstream combiner.

18 Claims, 3 Drawing Sheets

OPTICAL NETWORK ARCHITECTURE FOR SIMULTANEOUS TRANSPORT OF ANALOG VIDEO SIGNALS AND ETHERNET DATA

CROSS-REFERENCE TO RELATED APPLICATION

This application is related to, and claims a benefit of priority under 35 U.S.C. 119(e) from copending provisional patent application U.S. Ser. No. 60/502,323, filed Sep. 12, 2003, the entire contents of which are hereby expressly incorporated herein by reference for all purposes.

BACKGROUND OF THE INVENTION

1. Field of the Invention

The invention relates generally to the field of communications. More particularly, the invention relates to counter-propagation of a first signal and a second signal on an optical conductor. A specific embodiment of the invention relates to simultaneous transport of analog video signals and Ethernet data.

2. Discussion of the Related Art

Network service providers, such as CATV (cable access television) system operators, who deliver analog video service over their optical transport networks may also desire to offer high-speed data services over the same existing optical networks. In order to minimize the number of optical fibers required for the transport of both analog video and high-speed data, wavelength division multiplexing (WDM) methods may be used to combine the optical carriers transporting such services onto a small number of optical fibers.

The simplest arrangement to implement simultaneous optical transport of video and high-speed data is to combine all downstream optical carriers from the central office, head-end or hub, both analog video and high-speed data, onto a single fiber, and then demultiplex them in a secondary hub or in the field as required to deliver service to subscribers. Upstream or return signals, both analog and high-speed data, would be multiplexed onto a single fiber and transported to the head-end or central office where they would be demultiplexed and processed.

Because of nonlinear optical interactions in the optical fiber used for signal transport, such an arrangement can lead to unacceptable levels of interference of the high-speed data signals with the analog video signals, which typically have very demanding requirements for signal-to-noise and distortion levels. As a specific example, the simultaneous transport of analog video signals using multiple radio frequency (RF) sub-carriers on a 1310 nm optical carrier co-propagating in the same fiber with longer wavelength optical carriers transporting standard Fast Ethernet (100 Mbps) can, under certain circumstances, lead to excessive levels of interference at 62.5 MHz, resulting in unacceptable degradation of the video signal on NTSC channel 3. This interference because of nonlinear optical interactions in the optical fiber used for signal transport is due to the co-propagation of the optical carriers transporting digital data and analog video.

SUMMARY OF THE INVENTION

There is a need for the following aspects of the invention. Of course, the invention is not limited to these aspects.

According to an aspect of the invention, a process comprises: propagating a downstream signal on an optical signal conductor from an upstream combiner to a downstream combiner; and propagating an upstream signal on the optical signal conductor from the downstream combiner to the upstream combiner. According to another aspect of the invention, a machine comprises: an upstream combiner including an upstream bi-directional common port; an optical signal conductor coupled to the upstream bidirectional common port of the upstream combiner; and a downstream combiner including a downstream bidirectional common port coupled to the optical signal conductor.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Overview

The invention includes counter-propagation of a first signal and a second signal on an optical conductor. Propagating the two signals in opposite directions maximizes the difference between their velocities, thereby minimizing interaction (interference) between the signals due to third order non-linear properties of the optical conductor (e.g., glass). This approach is particularly advantageous in embodiments of the invention where one or more signals have stringent signal-to-noise and interference requirements, and where one or more of the signals causing interference are apt to have similar waveforms, such as idle mode waveforms in a WDM Ethernet protocol context.

The invention can include counter-propagation of the optical carriers for downstream analog video and upstream digital data on a common first optical transmission fiber, together with counter-propagation of the optical carriers for upstream analog return and downstream digital data on a common second optical transmission fiber (distinct from the downstream analog video transport) minimizes the number of optical fibers required to provide both analog video and high-speed data services while simultaneously minimizing the level of cross-talk interference of the digital data on the analog video signals. Although preferred embodiment of the invention utilize non-overlapping bands for the individual signals, the invention can utilize overlapping bands, albeit at an increased risk of signal scattering.

Further, the invention can optionally utilize optical isolators to restrict the transmission direction of various optical combining, add and/or drop filters as an aid in fool-proofing the installation of the network components. In addition, the invention can utilize physically different optical connectors on the CPE transmitter and receiver to help prevent misconnection to the network.

Exemplary Embodiment

Figure 1:
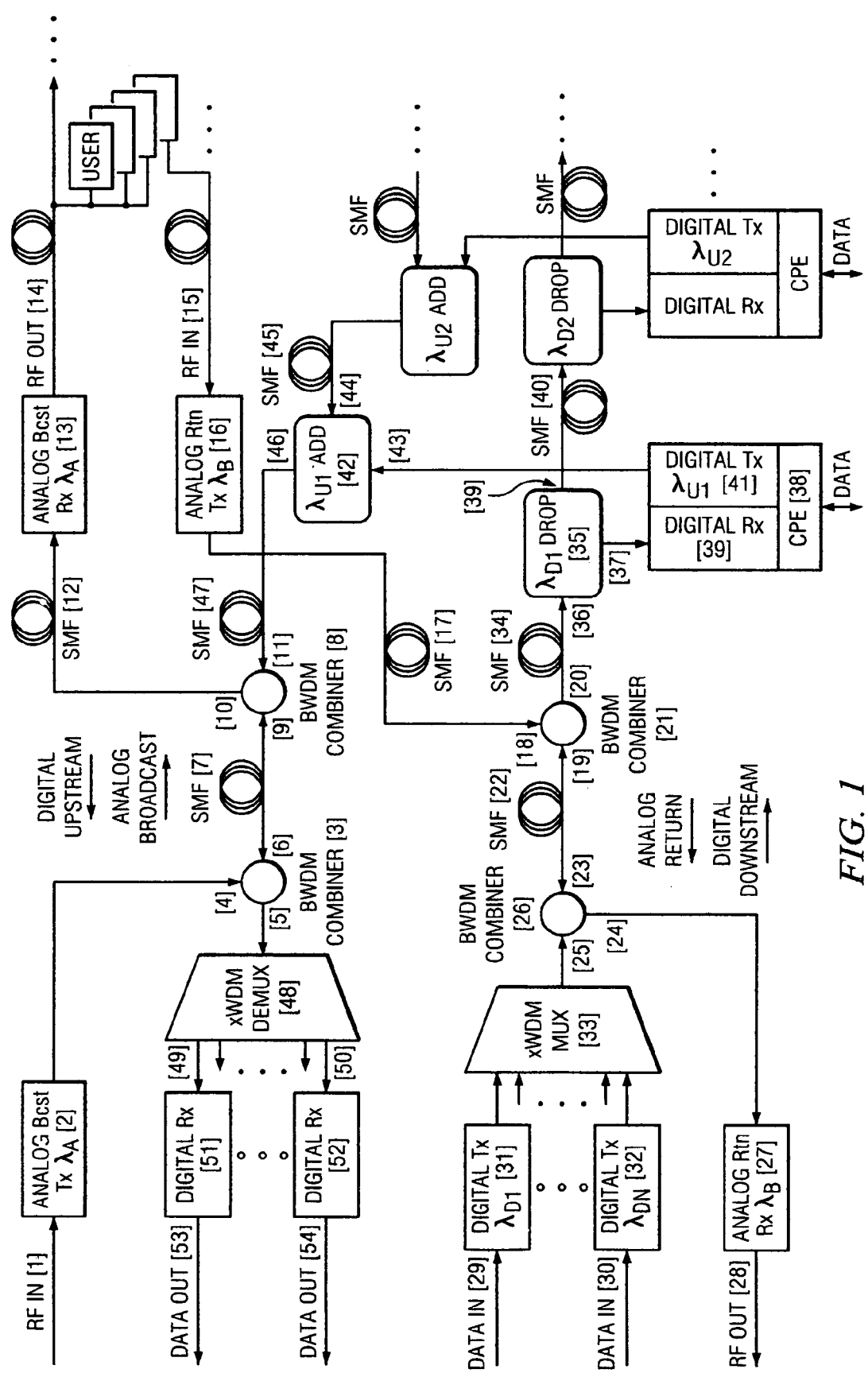
FIG. 1 illustrates a schematic block diagram of a network architecture to minimize interference of digital data on analog video signals, representing an embodiment of the invention.

Shown in FIG. 1 is a schematic diagram of an optical network architecture designed to reduce the interference of the digital data signals with the analog video signals to acceptable levels or eliminate it completely. The amelioration of interference between digital data signals and analog video signals is a long felt unmet need and the invention is the solution to this problem.

The invention can include a network architecture. A key feature of this architecture can be the counter-propagation of the optical carriers transporting analog video and digital data signals. Thus, on a given fiber, analog video signals are conducted in a first direction while digital data signals are conducted in a second, opposite direction.

Counter-propagation of the optical carrier(s) transporting analog video and the optical carrier(s) transporting digital data maximizes the nonlinear optical walk-off factor and, therefore, minimizes the net magnitude of the nonlinear optical cross-talk between the optical carrier(s) transporting the digital signals and the optical carrier(s) transporting the analog video signals.

Referring to FIG. 1, analog or quasi-analog video signals on radio frequency (sub-) carrier(s) 1 are input to one or more analog optical transmitters 2. For clarity of presentation in FIG. 1, a single analog broadcast transmitter 2 is shown, but in principle multiple analog optical transmitters may be optically multiplexed together. The optical output of the analog broadcast transmitter 2 is directed to one (a first) port 4 of a first bidirectional wavelength division multiplexing device (BWDM) 3. The first BWDM device 3 combines and separates optical carriers whose wavelengths lie in either of two distinct wavelength bands, $B_1$ and $B_2$. In more detail, the function of a basic BWDM device combiner is to pass any optical signal with a wavelength in a first band $B_1$ between a first input-output port 4 and the common port 6, and any optical signal with a wavelength in a second, distinct, non-overlapping, band $B_2$ between a second input-output port 5 and the common port 6. As will be discussed in more detail below, optical isolators may be added to cause specific ports of such a combiner device to transmit in only one direction as an aid in configuring the network correctly. The functional combination of such added isolators may be termed an interlock. The BWDM device can also provide the necessary level of wavelength isolation at the input-output ports between optical signals in the two wavelength bands $B_1$ and $B_2$.

The analog or quasi-analog broadcast optical carrier from broadcast transmitter 2 is passed to the common port 6 of the first BWDM device 3 and then into an optical transmission single mode fiber (SMF) 7. Of course, the invention is not limited to the use of single mode fiber and the invention can be implemented with multimode fiber, or even with free-space optics. The opposite end of the transmission fiber 7 is connected to the common port 9 of a second BWDM combiner 8, which directs the analog video optical carrier to a bandpass input-output port 10. The output of this port 10 is connected by an optical fiber 12 to an analog broadcast receiver 13, which is usually, but not necessarily, located in an optical node. The analog broadcast receiver 13 outputs the video signals on RF sub-carriers 14 to an electrical distribution system, usually, but not necessarily, a coaxial cable-based distribution system.

Analog return signals on RF sub-carriers 15, which are typically, but not necessarily, generated by subscribers' cable modems, are input to one or more analog return transmitters 16, which may or may not be co-located with the analog broadcast receiver 13. For clarity of presentation in FIG. 1, only one return transmitter 16 is shown, but in principle the outputs of multiple transmitters may be optically multiplexed together. The optical output of the analog return transmitter 16 is connected by a separate optical transmission fiber 17 to one input-output port 18 of a third BWDM combiner 21, which passes the analog return optical signal to the common port 19 and then onto an optical transmission fiber 22. The other end of the optical transmission fiber 22 is connected to the common port 23 of a fourth BWDM combiner 26, which passes the optical analog return signal through a band-pass input-output port 24 of the fourth BWDM combiner 26 and then into an analog return receiver 27. The analog return receiver 27 reproduces the analog return data on RF sub-carriers 28 for processing in the hub, head-end, or central office.

Downstream data signals 29, 30, typically but not necessarily high speed Ethernet, are sent to subscribers as inputs to a set of one or more downstream digital transmitters 31, 32, each of whose output optical signal is at a wavelength $\lambda_{Di}$ that is one of a set of N discrete wavelengths $\lambda_{D1}$ through $\lambda_{DN}$ which are in-turn typically, but not necessarily, allocated on standard wavelength plans such as the ITU (International Telecommunications Union) DWDM channel plan or the ITU CWDM channel plan. The optical output signals of the downstream digital transmitters 31, 32 are combined onto a single optical fiber 25 with an appropriate optical wavelength division multiplexer (xWDM) 33 (xWDM—signifying ITU DWDM, CWDM, or other wavelength allocation scheme). The output from xWDM 33 is directed to a band-pass input-output port 25 of the fourth BWDM combiner 26, which in turn passes the multiple downstream optical data signals to the common port 23 of the BWDM device 26 and then onto an optical transmission fiber 22. Significantly, the downstream optical data signals propagate in the same optical transmission fiber 22 as the upstream analog return, but in the opposite direction. The other end of the optical transmission fiber 22 is connected to the common port 19 of the third BWDM combiner 21. The downstream digital signals are directed to a band-pass input-output port 20 of the third BWDM combiner 21 and then onto an optical transmission fiber 34.

The other end of the optical transmission fiber 34 is connected to the input port 36 of a customer-premise drop filter 35, which directs all but one wavelength, $\lambda_{D1}$, to its bypass port 39. The optical carrier being dropped, $\lambda_{D1}$, is directed to the "drop" port 37 of the drop filter 35, which is connected to a digital receiver 39 that is part of a customer premise equipment (CPE) 38. Downstream data addressed to the subscriber is placed on an output port of the CPE 38. Upstream data generated by the subscriber is passed from an input port of the CPE 38 to a digital upstream transmitter 41, operating at an added wavelength $\lambda_{U1}$, which is usually but not necessarily the same as the dropped wavelength $\lambda_{D1}$. Of course, the invention is not limited to a CPE 38 having separate output and input ports or the use of the same wavelength for $\lambda_{U1}$ and $\lambda_{D1}$. The invention can include a downstream combiner including a downstream bi-directional common port coupled to the optical signal conductor, wherein the downstream combiner directs an analog video optical carrier to a bandpass input-output port that is connected by an optical fiber to an analog broadcast receiver: another upstream combiner including another upstream bi-directional common port; another optical signal conductor coupled to the another upstream bi-directional common port of the another upstream combiner; another downstream combiner including another downstream bi-directional common port coupled to the another optical signal conductor, wherein an optical output of an analog return transmitter is connected by a separate optical transmission fiber to an input-output port of the another downstream combiner, which passes the analog return optical signal to the common port and then onto the another optical signal conductor; a drop device coupled to a downstream output port of the downstream combiner; a customer premises equipment digital receiver input coupled to the drop device, the customer premises equipment digital receiver input including an input optical connector; and an add device coupled to a downstream input port of the another downstream combiner.

The output of the digital upstream optical transmitter 41 is directed to the "add" port 43 of a customer premise add filter 42, which combines it with other upstream digital optical carriers 44 from downstream CPEs and directs them to the output port 46 of the add filter 42. The output port 46 of the add filter 42 is connected via an optical transmission fiber 47 to an input-output port 11 of the second BWDM combiner 8. The second BWDM combiner 8 directs the multiple optical carriers transporting upstream digital data to its common port 9, and then through the optical transmission fiber 7 to the common port of the first BWDM device 3. Significantly, the upstream optical data signals propagate in the same optical transmission fiber 7 as the downstream analog, but in the opposite direction. The first BWDM combiner 3 directs the upstream digital optical carriers to an input-output port 5 and then into a optical wavelength de-multiplexer 48. Each output port of the de-multiplexer 48 is connected to a digital receiver 51, 52, which in-turn places the data stream carried by one of the upstream digital optical carriers on its corresponding output port for processing in the head-end, hub, or central office.

Wavelength Allocation

The downstream analog video optical transmitters and the upstream analog return transmitters can operate in the same wavelength band, referred to $B_1$. Similarly, the downstream digital optical transmitters and the upstream digital optical transmitters can operate in the same wavelength band, referred to as $B_2$, which can be separate and distinct from band $B_1$. Alternatively, an important to the invention, the downstream and upstream analog video optical transmitters can operate in separate wavelength bands, $B_1$ and $B_3$, respectively, and the downstream and upstream digital optical transmitters can operate in separate wavelength bands, $B_4$ and $B_2$, respectively, provided 1) that band $B_1$ does not overlap band $B_2$, and band $B_3$ does not overlap band $B_4$ and 2) that the four BWDM combiners 3, 8, 21, and 26 are constructed to support the appropriate wavelength bands as required by their functional port connections. In this alternative case B1 and B3 can be substantially the same, overlapping or discrete while B4 and B2 can independently be substantially the same, overlapping or discrete.

Wavelengths may be placed on conventional, equally spaced grids such as the ITU DWDM wavelength plan or the ITU CWDM plan. Alternatively, wavelengths may be allocated according to non-equal spacing. The invention can include optimization of the spacing to maximize the nonlinear optical walk-off factor and, therefore, minimize the net magnitude of the nonlinear optical cross-talk between the optical carrier(s) transporting the digital signals and the optical carrier(s) transporting the analog video signals.

Methods for Fool-Proofing Installation of Network Components

As described above, optimum operation of the network indicates that the downstream analog video optical carrier(s) counter-propagate with the upstream digital optical carrier(s) in a first optical fiber, and that the analog return optical carrier (s) and the downstream digital optical carrier(s) counter-propagate in a second optical fiber. It is preferred to construct the BWDM combiners (four devices 3, 8, 21, and 26 in FIG. 1) with one or more isolators on the appropriate port(s) to prevent optical carriers from propagating in the wrong direction(s).

Figure 2:
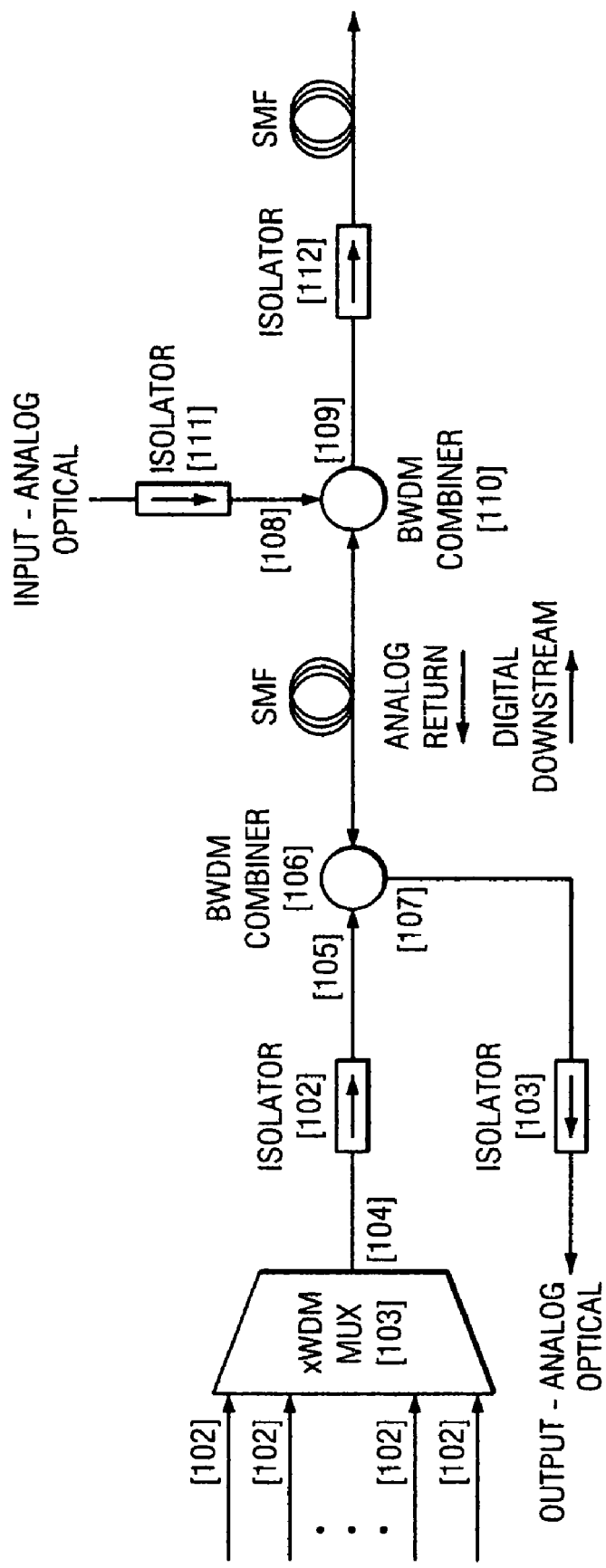
FIG. 2 illustrates a schematic block diagram of upstream and downstream combiners with isolators, representing an embodiment of the invention.

Referring to FIG. 2, optical isolators 102, 103 of appropriate optical band-pass may be placed at the input port 105 and the output port 107 of the BWDM device 106 (the arrow on the isolator indicates the allowed optical signal propagation direction through the isolator). Similarly, isolators 111, 112 may be placed on the input port 108 and the output port 109 of the BWDM combiner 110. Similar isolator configurations apply to the other set of BWDM combiners 3, 8 and the xWDM demux 48 that are shown in FIG. 1.

The xWDM mux or demux may or may not be contained within a common mechanical package as the BWDM combiner. Although not shown explicitly in FIG. 2, isolators may be placed on each of the input ports 102 of the xWDM mux or demux.

Figure 3:
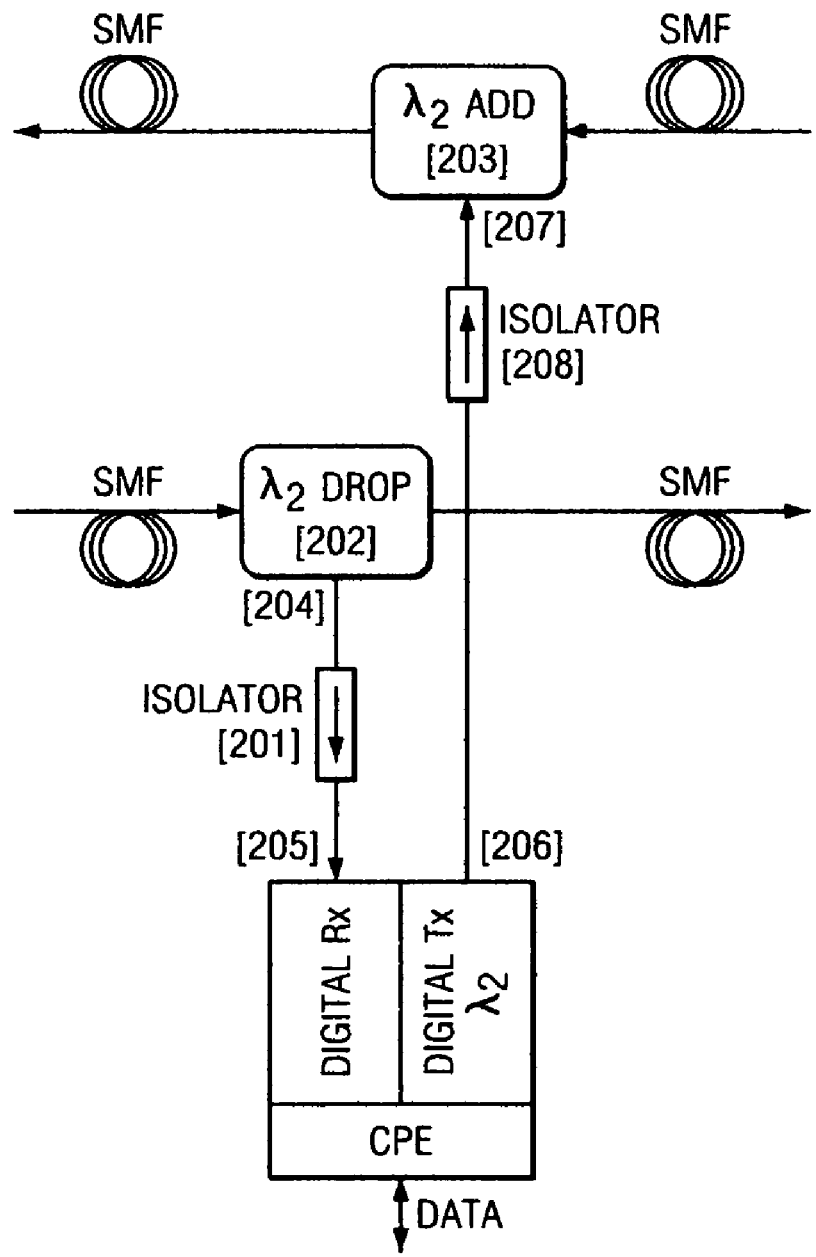
FIG. 3 illustrates a schematic block diagram of drop and add devices with isolators, representing an embodiment of the invention.

Referring to FIG. 3, similar use of isolators 201, 208 on the output port 204 of the drop filter 202 and the input port 207 of the add filter 203 may be employed to assure correct signal propagation directions. Although not shown explicitly in FIG. 3, additional isolators may or may not be placed on the other ports of the add or drop filters. The add and drop filters may be contained in either a common or separate mechanical packages.

Although not shown explicitly in FIG. 3, additional fool-proofing of the installation of the customer premise equipment (CPE) may be obtained by using physically different optical connector types on the CPE digital transmitter output 206 and the CPE digital receiver input 205. For instance, the invention can include the use of physically different, non-interchangeable (incompatible) form factor (e.g., asymmetric male and/or female) optical connectors and/or connector holders.

The invention can also be included in a kit. The kit can include some, or all, of the components that the invention comprises. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The disclosed embodiments show single mode optical fiber as the structure for performing the function of conveying signals, but the structure for conveying signals can be any other structure capable of performing the function of signal transfer, including, by way of example multimode optical fiber, optical cable, optical wave guides of planar or other cross-sectional shape, electronic conductors such as wire, (coax) cable, or alternatively even free-space.

While not being limited to any particular performance indicator or diagnostic identifier, preferred embodiments of the invention can be identified one at a time by testing for minimization of the level of cross-talk interference of the digital data on the analog video signals. The test for the presence of minimization of the level of cross-talk interference of the digital data on the analog video signals can be carried out without undue experimentation by the use of a simple and conventional video reception quality experiment.

Practical Applications of the Invention

A practical application of the invention that has value within the technological arts is the networking of analog and digital optical signals on the same fiber(s). Further, the invention is useful in conjunction with wide area or metropolitan area data networking (such as are used for the purpose of fiber to the neighborhood), or in conjunction with customer premises data networking (such as are used for the purpose of fiber to the home), or the like. There are virtually innumerable uses for the invention, all of which need not be detailed here.

Advantages of the Invention

A network architecture, representing an embodiment of the invention, can be cost effective and advantageous for at least the following reasons. Importantly, counter-propagation of the optical carrier(s) transporting analog video and the optical carrier(s) transporting digital data maximizes the nonlinear optical walk-off factor and, therefore, minimizes the net magnitude of the nonlinear optical cross-talk between the optical carrier(s) transporting the digital signals and the optical carrier(s) transporting the analog video signals. The invention is particularly advantageous in contexts where one or more signals are apt to have similar waveforms, such as idle mode waveforms in a CWDM protocol. The invention improves quality and/or reduces costs compared to previous approaches.

The terms a or an, as used herein, are defined as one or more than one. The term plurality, as used herein, is defined as two or more than two. The term another, as used herein, is defined as at least a second or more. The terms "comprising" (comprises, comprised), "including" (includes, included) and/or "having" (has, had), as used herein, are defined as open language (i.e., requiring what is thereafter recited, but open for the inclusion of unspecified procedure(s), structure(s) and/or ingredient(s) even in major amounts. The terms "consisting" (consists, consisted) and/or "composing" (composes, composed), as used herein, close the recited method, apparatus or composition to the inclusion of procedures, structure(s) and/or ingredient(s) other than those recited except for ancillaries, adjuncts and/or impurities ordinarily associated therewith. The recital of the term "essentially" along with the terms "consisting" or "composing" renders the recited method, apparatus and/or composition open only for the inclusion of unspecified procedure(s), structure(s) and/or ingredient(s) which do not materially affect the basic novel characteristics of the composition. The term coupled, as used herein, is defined as connected, although not necessarily directly, and not necessarily mechanically. The term any, as used herein, is defined as all applicable members of a set or at least a subset of all applicable members of the set. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

All the disclosed elements and features of each disclosed embodiment can be combined with, or substituted for, the disclosed elements and features of every other disclosed embodiment except where such elements or features are mutually exclusive. Variation may be made in the steps or in the sequence of steps defining methods described herein.

Although the architectures described herein can be a separate module, it will be manifest that the architectures may be integrated into the (meta-) network with which they are associated. The individual components need not be combined in the disclosed configurations, but could be combined in all possible configurations.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
propagating a downstream signal on an optical signal conductor from an upstream combiner to a downstream combiner, wherein the downstream signal includes an analog video broadcast signal;
counter-propagating an upstream signal on the optical signal conductor from the downstream combiner to the upstream combiner, wherein the upstream signal includes a digital signal;
propagating another downstream signal on another optical signal conductor from another upstream combiner to another downstream combiner, wherein the another downstream signal includes a digital signal;
counter-propagating another upstream signal on the another optical signal conductor from the another downstream combiner to the another upstream combiner, wherein the another upstream signal includes an analog return signal;
broadcasting at least a portion of the downstream signal to a plurality of users and conveying a signal from at least one of the plurality of users to an input port of the another downstream combiner as the another upstream signal; and
distributing at least a portion of the another downstream signal to a plurality of users and conveying a signal from at least one of the plurality of users to an input port of the downstream combiner as the upstream signal.

2. The method of claim 1, wherein the digital signal includes a packet switched signal.

3. The method of claim 2, wherein the packet switched signal includes a cell-switched signal.

4. The method of claim 3, wherein the cell-switched signal includes an asynchronous transfer mode digital data signal.

5. The method of claim 2, wherein the packet switched signal includes a frame switched signal.

6. The method of claim 5, wherein the cell-switched signal includes a synchronous transfer mode digital data signal.

7. The method of claim 2, further comprising wavelength demultiplexing the upstream signal after propagating the upstream signal on the optical signal conductor from the downstream combiner to the upstream combiner.

8. The method of claim 2, further comprising adding data from a customer premises to the upstream signal before propagating the upstream signal on the optical signal conductor from the downstream combiner to the upstream combiner.

9. The method of claim 2, further comprising dropping data to a customer premises from the another downstream signal after propagating the another downstream signal on the another optical signal conductor from the second upstream combiner to the another downstream combiner.

10. A process of operating a cable access television network comprising the method of claim 1.

11. An apparatus, comprising:
an upstream combiner including an upstream bi-directional common port;
an optical signal conductor coupled to the upstream bi-directional common port of the upstream combiner;
a downstream combiner including a downstream bi-directional common port coupled to the optical signal conductor, wherein the downstream combiner directs an analog video optical carrier to a bandpass input-output port that is connected by an optical fiber to an analog broadcast receiver;
another upstream combiner including another upstream bi-directional common port;
another optical signal conductor coupled to the another upstream bi-directional common port of the another upstream combiner;
another downstream combiner including another downstream bi-directional common port coupled to the another optical signal conductor, wherein an optical output of an analog return transmitter is connected by a separate optical transmission fiber to an input-output port of the another downstream combiner, which passes the analog return optical signal to the common port and then onto the another optical signal conductor;
a drop device coupled to a downstream output port of the another downstream combiner;
a customer premises equipment including a customer premises equipment digital receiver input and a customer premises equipment digital receiver output, wherein the a customer premises equipment digital receiver input is coupled to the drop device, the customer premises equipment digital receiver input including an input optical connector; and
an add device coupled to a downstream input port of the downstream combiner; wherein
a customer premises equipment digital receiver output is coupled to the add device, the customer premises equipment digital receiver output including an output optical connector, and
wherein the input optical connector and the output optical connector define physically different, non-interchangeable form factors.

12. The apparatus of claim 11, further comprising an upstream input optical isolator coupled to an upstream input port of the another upstream combiner and an upstream output optical isolator coupled to an upstream output port of the another upstream combiner.

13. The apparatus of claim 11, further comprising a downstream input optical isolator coupled to a downstream input port of the another downstream combiner and a downstream output optical isolator coupled to a downstream output port of the another downstream combiner.

14. The apparatus of claim 11, further comprising a wavelength division multiplexer coupled to an upstream input port of the another upstream combiner.

15. The apparatus of claim 11, further comprising a wavelength division demultiplexer coupled to an upstream output port of the upstream combiner.

16. The apparatus of claim 11, further comprising an optical isolator coupled to the drop device.

17. The apparatus of claim 11, further comprising an optical isolator coupled to the add device.

18. A cable access television network, comprising the apparatus of claim 11.

* * * * *